(No Model.) 3 Sheets—Sheet 1.
S. OAKMAN.
GLASS MOLD.

No. 486,182. Patented Nov. 15, 1892.

WITNESSES. INVENTOR
Frank H. Parker Samuel Oakman
William Edson

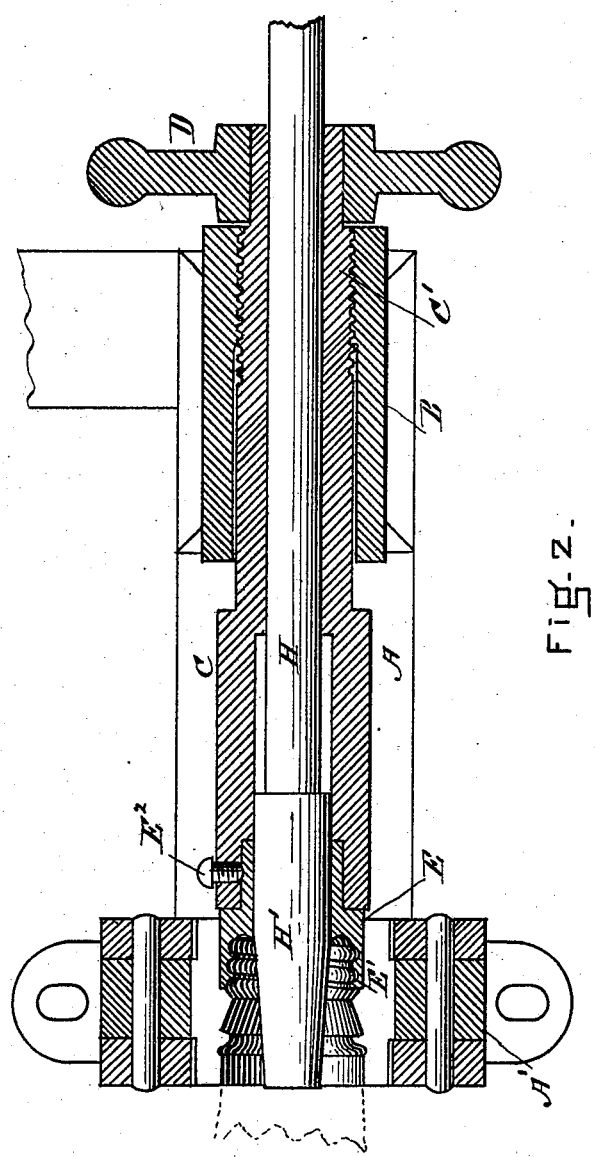

(No Model.)  S. OAKMAN.  3 Sheets—Sheet 3.
GLASS MOLD.

No. 486,182.  Patented Nov. 15, 1892.

WITNESSES
Frank G. Parker
William Eason

INVENTOR
Samuel Oakman

UNITED STATES PATENT OFFICE.

SAMUEL OAKMAN, OF MELROSE, MASSACHUSETTS.

GLASS-MOLD.

SPECIFICATION forming part of Letters Patent No. 486,182, dated November 15, 1892.

Application August filed 12, 1892. Serial No. 442,902. (No model.)

*To all whom it may concern:*

Be it known that I, SAMUEL OAKMAN, of Melrose, in the county of Middlesex and State of Massachusetts, have invented a new and useful Improvement in Glass-Molds, of which the following, taken in connection with the accompanying drawings, is a specification.

My invention relates to that class of glassware in which the neck or terminal consists of a reinforced part having a screw-thread formed on it, the object being to so construct the mold that the article may be made rapidly and with great precision and evenness. This object I attain by means of the mechanism shown in the accompanying drawings, in which—

Figure 1:
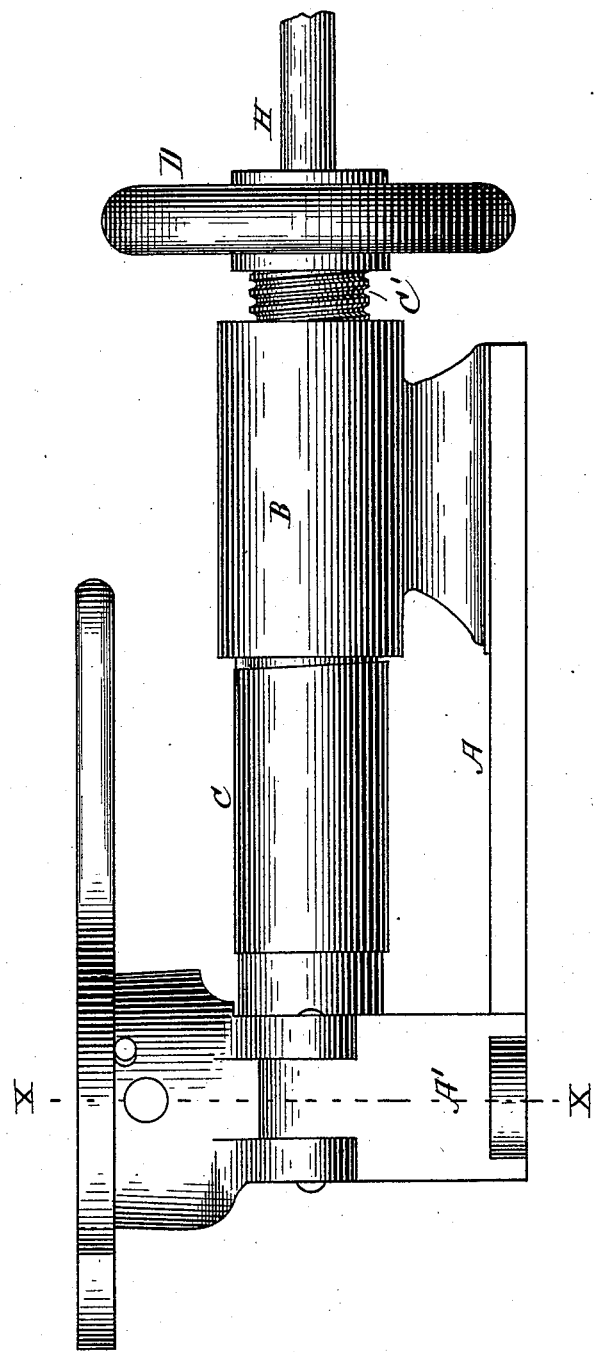
Figure 4:
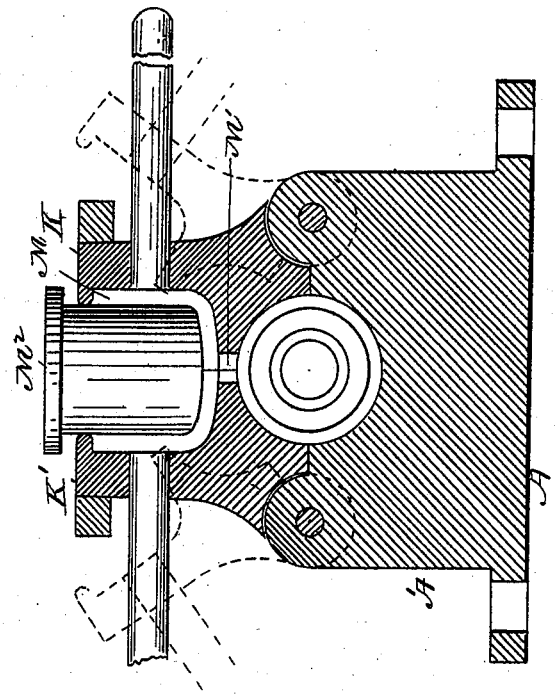
Figure 6:
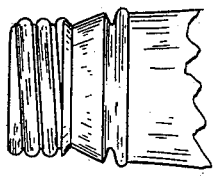
Figure 5:
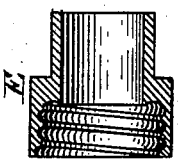
Figure 3:
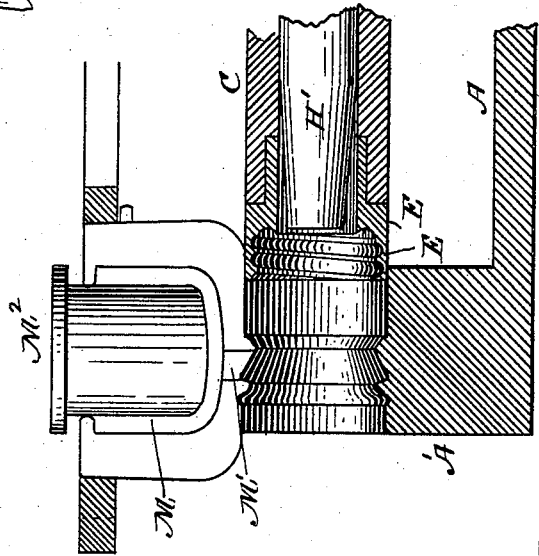

Figure 1 is a side elevation of my mold and its operating parts. Fig. 2 is a horizontal longitudinal section of the same. The end of a neck of a bottle is shown in the mold in dotted lines. Fig. 3 is a vertical longitudinal section showing a part of the mold. Fig. 4 is a vertical cross-section of the mold, taken on line $x\ x$ of Fig. 1. Fig. 5 is a section showing the member of the mold that forms the screw on the terminal of the article worked upon. Fig. 6 shows in elevation the end of a neck of a bottle or other article as it appears when it leaves my mold.

My invention is particularly adapted to form screw-threads on the necks of large bottles or carboys, although it is adapted for other uses.

The particular feature of the device is to form an even, smooth, and true screw-threaded neck, and it is for this object that I have introduced the detachable die-thimble shown in Fig. 5.

My mold proper consists of a part A', attached to a base-piece A, and the two hinged lateral members K K'. (See Fig. 4.) These parts when closed form together the mold for that part of the neck that is just below the screw-thread and are interiorly provided with members formed to produce the desired shape for the neck of the bottle. The reinforcement of the neck of the bottle is produced by the following manipulation: The neck of the bottle while still hot is inserted into the mold, then, the mold being closed, a portion of melted glass is inserted into the chamber M, Figs. 3 and 4, and the plunger $M^2$ is forced downward into the chamber. This causes the glass to flow through the opening M' into the mold and around the neck of the bottle, forming the desired reinforcement. At the same time that the reinforcement is being made the screw is formed, as will be explained.

A mandrel C C' is mounted in a screw-housing B, Figs. 1 and 2, and is provided with a hand-wheel D, by which it may be turned. Connected to the inner end of the mandrel C C', I have a screw-die thimble-piece E, having an internal thread E', of the same pitch as that of the thread at C' on the mandrel C C', so that in turning the mandrel the die E will have a longitudinal movement to correspond to the movement of that which would be required by the movement of the same thread E' on the die and glass in the mold.

H, Figs. 1 and 2, is a sliding spindle having a conical head H', as shown in Fig. 2. This spindle H should be provided with a suitable handle or lever by which it may be drawn in or out.

The screw-die thimble E, preferably of one piece or at least so made as to act as one piece, is made detachable and is held in place by the set-screw $E^2$ or by any other convenient device. The die-thimble E may be taken out and any other of a different style and size may be substituted for it.

The art of forming the screw-thread on the glass is done at the same time that the reinforcement is effected. Thus the molten glass flows under the pressure exerted by the plunger $M^2$ into the die-thimble E, the sliding spindle H H' having been forced into the neck of the bottle, as shown in Fig. 2, the glass completely filling the die and surrounding the spindle and forming an even thread. As soon as this is accomplished the spindle H is withdrawn. Then as soon as the glass hardens the mandrel C, and with it the die-thimble E, is rotated, so as to cause the die-thimble to screw off from the glass. Now the mold is opened and the molded article taken out.

I claim—

In a glass-mold having a reinforcing-chamber M, the combination of a sliding spindle H H' for keeping the neck of the bottle open with a rotating die-thimble E, adapted to be rotated and withdrawn, substantially as and for the purpose set forth.

In testimony whereof I have signed my name to this specification, in the presence of two subscribing witnesses, on this 10th day of August, A. D. 1892.

SAMUEL OAKMAN.

Witnesses:
WILLIAM EDSON,
FRANK G. PARKER.